United States Patent
Lee et al.

(10) Patent No.: US 11,875,251 B2
(45) Date of Patent: Jan. 16, 2024

(54) NEURAL NETWORK METHOD AND APPARATUS

(71) Applicant: Samsung Electronics Co., Ltd., Suwon-si (KR)

(72) Inventors: Junhaeng Lee, Hwaseong-si (KR); Hyunsun Park, Seoul (KR); Sehwan Lee, Suwon-si (KR); Seungwon Lee, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 950 days.

(21) Appl. No.: 16/244,644

(22) Filed: Jan. 10, 2019

(65) Prior Publication Data

US 2019/0340504 A1    Nov. 7, 2019

Related U.S. Application Data

(60) Provisional application No. 62/666,269, filed on May 3, 2018.

(30) Foreign Application Priority Data

Jul. 4, 2018    (KR) .......................... 10-2018-0077496

(51) Int. Cl.
   *G06N 3/08*    (2023.01)
   *G06N 3/0495*  (2023.01)

(52) U.S. Cl.
   CPC ............. *G06N 3/08* (2013.01); *G06N 3/0495* (2023.01)

(58) Field of Classification Search
   None
   See application file for complete search history.

(56) References Cited

U.S. PATENT DOCUMENTS

| 9,524,450 B2 | 12/2016 | Ravindran et al. |
| 2015/0125049 A1* | 5/2015 | Taigman ............... G06T 3/0006 |
| | | 382/118 |
| 2016/0328647 A1* | 11/2016 | Lin .......................... G06N 3/08 |
| 2017/0337470 A1* | 11/2017 | DeTone .................. G06F 17/16 |
| 2019/0050710 A1* | 2/2019 | Wang ..................... G06N 3/063 |
| 2019/0171927 A1* | 6/2019 | Diril ........................ G06N 3/08 |
| 2022/0366258 A1 | 11/2022 | Garner |

FOREIGN PATENT DOCUMENTS

| JP | 2009-516246 A | 4/2009 |
| KR | 10-2006-0094006 A | 8/2006 |

OTHER PUBLICATIONS

Y, Zhou et al. Adaptive Quantization for Deep Neural Network. Dec. 4, 2017. [retrieved from arXiv on Jan. 28, 2022] <URL: https://arxiv.org/pdf/1712.01048.pdf> (Year: 2017).*

(Continued)

*Primary Examiner* — Bion A Shelden
(74) *Attorney, Agent, or Firm* — NSIP Law

(57) ABSTRACT

A neural network method and apparatus is provided. A processor-implemented neural network method includes determining, based on a determined number of classes of input data, a precision for a neural network layer outputting an operation result, and processing parameters of the layer according to the determined precision.

19 Claims, 7 Drawing Sheets

(56) References Cited

OTHER PUBLICATIONS

H Li et al. Training Quantized Nets: A Deeper Understanding. arXiv. Nov. 13, 2017. [retrieved from the internet on Oct. 22, 2022] <URL: https://arxiv.org/abs/1706.02379> (Year: 2017).*

P Yin et al. Quantization and Training of Low Bit-Width Convolutional Neural Networks for Object Detection. arXiv. Aug. 17, 2017. [retrieved from the internet on Oct. 22, 2022] <URL: https://arxiv.org/abs/1612.06052> (Year: 2017).*

A Zhou et al. Incremental Network Quantization: Towards Lossless CNNs with Low-Precision Weights. arXiv. Aug. 25, 2017. [retrieved from the internet on Oct. 22, 2022] <URL: https://arxiv.org/abs/1702.03044> (Year: 2017).*

A Gholami et al. A Survey of Quantization Methods for Efficient Neural Network Inference. arXiv. Mar. 25, 2021. [retrieved on Jan. 26, 2023] <URL: https://arxiv.org/pdf/2103.13630v1.pdf> (Year: 2021).*

B Jacob et al. Quantization and Training of Neural Networks for Efficient Integer-Arithmetic-Only Inference. arXiv. Dec. 15, 2017. [retrieved on Jan. 26, 2023] <URL: https://arxiv.org/pdf/1712.05877.pdf> (Year: 2017).*

Miyashita, Daisuke et al., "Convolutional Neural Networks using Logarithmic Data Representation", arXiv preprint arXiv:1603.01025, Mar. 17, 2016 (10 pages in English).

Gysel, Philipp Matthias. "Ristretto: Hardware-Oriented Approximation of Convolutional Neural Networks", arXiv preprint arXiv:1605.06402 May 20, 2016 (73 pages in English).

Reagen, Brandon et al., "Minerva: Enabling Low-Power, Highly-Accurate Deep Neural Network Accelerators", *2016 ACM/IEEE 43rd Annual International Symposium on Computer Architecture (ISCA)*, Jun. 18-22, 2016 (pp. 267-278).

Zhou, Shuchang, et al. "Dorefa-net: Training Low Bitwidth Convolutional Neural Networks with Low Bitwidth Gradients", arXiv preprint arXiv:1606.06160, Feb. 2, 2018 (pp. 1-13).

Raghavan A, et al., "Bit-Regularized Optimization of Neural Nets", arXiv preprint arXiv:1708.04788, 2017, pp. 1-12 (12 pages in English).

Yang B, et al., "Quantization and Training of Object Detection Networks with Low-Precision Weights and Activations", *Journal of Electronic Imaging*, 27 (1), 2018, pp. 1-12 (12 pages in English).

Wu S et al., "Training and Inference with Integers in Deep Neural Networks", arXiv: 1802.04680v1, Feb. 2018, pp. 1-14 (14 pages in English).

Extended European Search Report dated Sep. 30, 2019 in Corresponding European Patent Application No. 19169298.7 (7 pages in English).

Korean Office Action dated Dec. 11, 2022, in counterpart Korean Patent Application No. 10-2018-0077496 (4 Pages in English, 5 Pages in Korean).

Ishii, Jun, et al., "Evaluation of Quantization Bit Width Optimization for Each Neuron for DNN" IPSJ SIG Technical Report, Jan. 19, 2018, (8 pages in English, 8 pages in Japanese).

Japanese Office Action dated Apr. 25, 2023, in counterpart Japanese Patent Application No. 2019-075655 (4 pages in English, 3 pages in Japanese).

\* cited by examiner

NEURAL NETWORK METHOD AND APPARATUS

CROSS-REFERENCE TO RELATED APPLICATIONS

This application claims the benefit under 35 USC § 119(e) of U.S. Patent Application Ser. No. 62/666,269, filed on May 3, 2018, in the U.S. Patent and Trademark Office, and the benefit under 35 USC § 119(a) of Korean Patent Application No. 10-2018-0077496, filed on Jul. 4, 2018, in the Korean Intellectual Property Office, the entire disclosures of each of which are incorporated herein by reference for all purposes.

BACKGROUND

1. Field

The present disclosure relates to a neural network method and apparatus.

2. Description of the Related Art

Technological automation of feature extraction, pattern recognition, and/or analyses, as only examples, has been implemented through processor implemented neural network models, as specialized computational architectures, that after substantial training may provide computationally intuitive feature extractions or recognitions, mappings between input patterns and output patterns, pattern recognitions of input patterns, categorization, or classification in various forms. The trained capability of extracting such information or recognitions, generating such mappings, performing such pattern recognitions, or performing such categorizations or classifications may be referred to as a learning capability of the neural network. Such trained capabilities may also enable the specialized computational architecture to classify an input pattern or object(s), or portions of the input pattern or object(s), e.g., as a member that belongs to one or more predetermined groups. Further, because of the specialized training, such specially trained neural network may thereby have a generalization capability of generating a relatively accurate or reliable output with respect to an input pattern that the neural network may not have been trained for, for example. However, because such operations are performed through such specialized computation architectures, and in different automated manners than they would have been performed in non-computer implemented or non-automated approaches, they also invite problems or drawbacks that only occur because of the automated and specialized computational architecture manner in which they are implemented.

Such neural network implementations also require many operations for complex input data, which may require large power consumption and require long processing times. Further, attempts to reduce such processing requirements that are implemented result in degradations in accuracy and precision.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented neural network method includes determining, based on a determined number of classes of input data, a precision for a neural network layer outputting an operation result, and processing parameters of the layer according to the determined precision.

The method may indicate a result of the neural network based on a result of the processing of the parameters of the layer. The method may include generating loss information based on the processing of the parameters of the layer, and training the neural network based on the generated loss with consideration of the training precision for the neural network layer.

The method may include the precision being determined proportionally to the determined number of classes.

The method may include determining whether the number of classes meets a predetermined threshold, and when the number of classes is determined to meet the predetermined threshold, determining the precision for the layer to be higher than a precision of other layers in the neural network.

The method may include the precision corresponding to a bit width of the parameters of the layer.

The method may include the layer being a last fully-connected layer of the neural network.

The method may include the neural network further comprising a softmax layer connected to and following the layer, and a loss layer connected to the softmax layer, and the method may further comprise training the neural network based on a gradient of a cross-entropy loss derived from a loss generated by the loss layer.

The method may include the parameter comprising a gradient of the cross-entropy loss with respect to the operation result input to the layer and a weight of the layer.

In another general aspect, a computer-readable recording medium stores instructions which when executed one or more processors causes the one or more processors to perform the processor-implemented neural network methods described above.

In another general aspect, a neural network apparatus includes a processor configured to obtain information about a number of classes into which input data is classified, determining a precision for a layer outputting an operation result based on the obtained information about the number of classes, and processing the parameters in the layer outputting an operation result according to the determined precision.

The apparatus may indicate a result of the neural network based on a result of the processing of the parameters of the layer.

The method may include generating loss information based on the processing of the parameters of the layer, and training the neural network based on the generated loss with consideration of the training precision for the neural network layer.

The processor may be further configured to determine the precision for the layer outputting an operation result to be based on the number of classes.

The apparatus may include the processor being further configured to determine the precision for the layer outputting an operation result to be higher than that for other layers in the neural network, when the number of classes is greater than or equal to a predetermined threshold.

The apparatus may include the precision representing a bit width of a parameter to be processed in the layer.

The apparatus may include the layer outputting an operation result being a last fully-connected layer in the neural network.

The apparatus may include the layer outputting an operation result being connected to a softmax layer and a loss layer and the processors further configured to train the neural network based on a gradient of a cross-entropy loss.

The apparatus may include the parameter including a gradient of the cross-entropy loss with respect to the operation result and a weight of the layer.

The apparatus may include a memory storing instructions, which when executed by the processor configure the processor to perform the determining of the precision for the layer, and the processing of the parameters of the layer.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
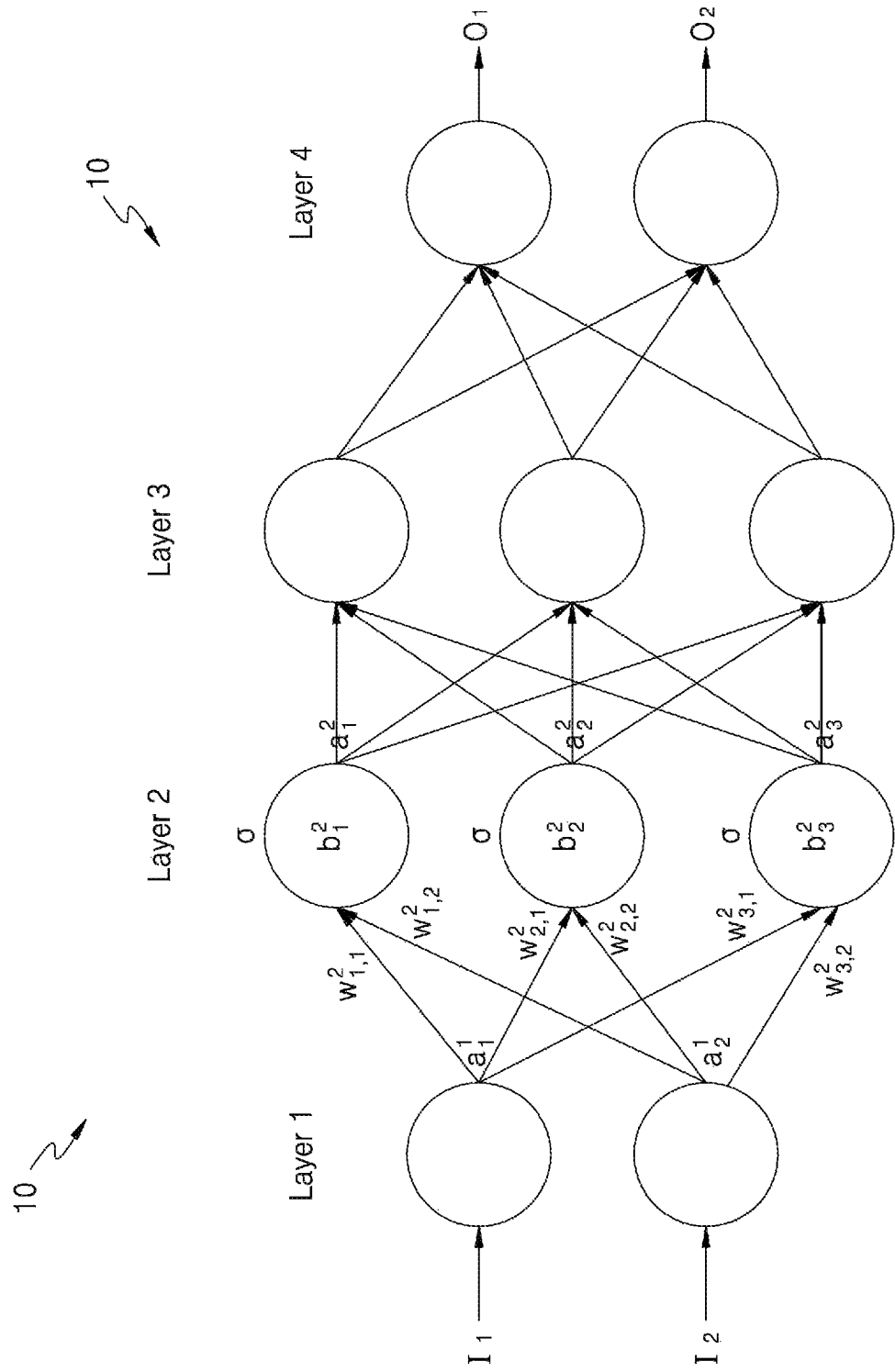
FIG. 1 is a diagram illustrating an example of a neural network according to one or more embodiments.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

As used herein, the terms 'comprises' or 'comprising' and the like should not be construed as necessarily including all of various elements or operations described in the specification and should be as excluding some of them, or may be interpreted as including additional components or operations.

Also, as used herein, the terms including ordinals such as "first" or "second" may be used to describe various elements, but the elements should not be limited by the terms. The terms are used only for the purpose of distinguishing one element from another.

FIG. 1 is a diagram illustrating an example of a neural network 10 according to one or more embodiments.

Referring to FIG. 1, the neural network 10 may have a structure including an input layer, hidden layers, and an output layer. The neural network 10 may perform an operation based on received input data (for example, $I_1$ and $I_2$) and generate output data (for example, $O_1$ and $O_2$) based on a result of the operation.

The neural network 10 may be a deep neural network (DNN) or an n-layers neural network including one or more hidden layers. For example, as illustrated in FIG. 1, the neural network 10 may be a DNN including an input layer Layer 1, two hidden layers (a second layer Layer 2 and a third layer Layer 3), and an output layer Layer 4. The DNN may be a convolutional neural network (CNN), a recurrent neural network (RNN), a deep belief network, a restricted Boltzman machine, or examples may be implemented through other machine learning architectures, and thus, examples are not limited thereto. The use of the term 'may' herein with respect to an example or embodiment, e.g., as to what an example or embodiment may include or implement, means that at least one example or embodiment exists where such a feature is included or implemented while all examples and embodiments are not limited thereto.

When the example neural network 10 includes a DNN structure, the neural network 10 may include more layers that may extract or generate new or inferred effective information. Thus, in various examples, the neural network 10 may handle more complex data sets than previous machine learning approaches. In FIG. 1, the neural network 10 is illustrated as including four layers, but this is only an example, and the neural network 10 may include less or more layers. In addition, the neural network 10 may include layers of various structures different from those illustrated in FIG. 1. In an embodiment, the neural network 10 may include, as a DNN, a convolutional layer, a pooling layer, or a fully connected layer.

Each of the layers included in the neural network 10 may include a plurality of nodes, which may also be referred to as nodes 'processing elements (PEs)', 'units', or similar computational architectural terms. In the embodiment illustrated in FIG. 1 the input layer Layer 1 may include two nodes and the second layer Layer 2 may include three nodes. However, this is only an example and each of the layers included in the neural network 10 may include various numbers of nodes. Accordingly, the neural network 10 includes a plurality of layers, and each of the layers includes a plurality of nodes. Depending on the architecture of the neural network 10, nodes included within layers and/or in neighboring layers may be selectively connected according to respective connections, e.g., which may or may not be weighted. For example, the neural network 10 may be implemented by a processor, i.e., one or more processors, configured to generate a neural network structure/architecture with such a plurality of layers each including plural nodes and configured to apply such example weighted connections between neighboring nodes in neighboring layers of the neural network structure, and/or apply example kernels or weighted connections within layers, to interpret input data applied to the neural network structure. As only examples, herein such an 'interpretation' of input data may include a performed recognition, verification, or rejection, or input data binary or multi-class classification, clustering, pattern observation, transformation, and/or regression, as well as any other trained objective of the neural network in various examples.

The nodes included in each of the layers included in the neural network 10 may be connected to one another to exchange data. In an embodiment, one node may receive data from other nodes and operate according to the received data, and output operation results to other nodes.

An output value of each of the nodes may be referred to as an activation, i.e., as a respective result of one or more activation functions of a corresponding node applied with respect to at least input information to the corresponding node. For example, the activation may be as simple as rectified linear unit (ReLU), sigmoid function, or tanh applied to the summation of multiple weighted inputs, or the nodes may be more complex, such being gated or long short-term memory nodes, as non-limiting examples. Thus, an activation may be the output value of one node of one layer, and then may be an input value for one or more nodes included in one or more next layers, further subsequent layers, one or more previous layers or the same layer, or another neural network. Thus, as only an example, each of the nodes of the example neural network 10 may generate its activation based on activations and weights received from the nodes included in a previous layer. The weight may be a trained parameter of the neural network 10 that results from training of parameters of an initial or interim neural network, for example. Thus, a trained weight may be applied to a particular input (or resultant activation from a previous node/layer) to a node, with respective other trained weights being applied to other respective inputs to the node, such that the activation of the node with respect to such weighted inputs and may be a value or activation result that is then output and assigned to a connection relationship between that node and one or more next nodes. In addition to such weight parameters the neural network 10 may also apply biases for such activations. The biases may be set or trained during the training of the neural network 10, for example.

Thus, each of the nodes may be a computational unit that receives one or more data values and outputs the activation, and ultimately may map inputs to outputs. For example, when σ is an activation function, $w_{jk}^i$ is a weight from the $k^{th}$ node in the $(i-1)^{th}$ layer to the $j^{th}$ node in the $i^{th}$ layer, and $b_j^i$ is a bias value of the $j^{th}$ layer, and a is the activation of the $j^{th}$ node in the $i^{th}$ layer, the activation $a_j^i$ may be expressed by Equation 1.

$$a_j^i = \sigma(\Sigma_k(w_{jk}^i \times a_k^{i-1}))$$ Equation 1:

As illustrated in FIG. 1, the activation of the first node in the second layer Layer 2 may be expressed as $a_1^2$. In addition, $a_1^2$ may have a value of $\sigma(w_{1,1}^2 \times a_1^1 + w_{1,2}^2 \times a_2^1 + b_1^2)$ according to Equation 1. However, the above-described Equation 1 is only an example for describing the activation and the weight used for processing data in the neural network 10, but is not limited thereto. As noted in the above example, the activation may be a value obtained by processing through a ReLU a value obtained by applying the activation function to a weighted sum of activations received from the previous layer.

As described above, in the neural network 10, numerous data sets may be exchanged between a plurality of channels interconnected to one another, and may undergo numerous operations processes while passing through layers. In examples herein, it is found that a technology that may improve neural networks, as well as improve the training of such neural networks, by decreasing the amount of operations needed to process complicated input data and simultaneously reduce accuracy loss may be desired, thereby improving the computer functionality of the corresponding neural network apparatuses and methods.

Accordingly, one or more embodiments provide technological improvements that may include improving processing operations (e.g. helping to improve speed and helping to minimize any corresponding accuracy loss) of a processor, reduce memory requirements, improve memory access speeds, and/or improve the speed of classification determinations. Further, with one or more embodiments, more complex and sophisticated trained neural networks may be performed on processing systems that have lesser capabilities, such as in mobile examples, where such trained neural networks may not have been available for implementation or may not have been able to be performed with sufficient speed to operate in real-time during operation of such mobile apparatuses, as non-limiting examples.

Figure 2:
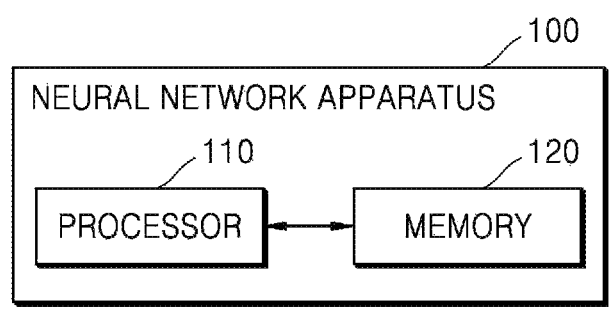
FIG. 2 is a block diagram of a hardware configuration of a neural network apparatus according to one or more embodiments.

FIG. 2 is a block diagram of a hardware configuration of a neural network apparatus 100 according to an embodiment.

Referring to FIG. 2, the neural network apparatus 100 may include a processor 110 and a memory 120. The neural network apparatus 100 may include the options and apparatuses of 600 of FIG. 6, and additional hardware components such as in mobile apparatus examples.

In an example, the neural network apparatus 100 may correspond to a computing device comprising one or more processors having various processing functions such as functions to generate a neural network, train or learn the neural network, quantize a floating-point type neural network to a fixed-point type neural network, or retrain the neural network. In an embodiment, the neural network apparatus 100 may be implemented in various types of devices such as personal computers (PCs), server devices, mobile devices, etc. Also, the neural network apparatus 100 may include a hardware accelerator for driving a neural network. The hardware accelerator may correspond to, for example, a neural processing unit (NPU), a tensor processing unit (TPU), a neural engine, etc., which are dedicated modules for driving the neural network, but the present disclosure is not limited thereto.

The processor 110 may perform all control operations to control the neural network apparatus 100. In an embodiment, the processor 110 controls all functions of the neural network apparatus 100 by executing complex readable instructions stored in the memory 120 in the neural network apparatus 100. The processor 110 may be implemented by a central processing unit (CPU), a graphics processing unit (GPU), an application processor (AP), etc., which are provided in the neural network apparatus 100. However, the present disclosure is not limited thereto.

The memory 120 is hardware for storing various pieces of data processed in the neural network apparatus 100. For example, the memory 120 may store data processed and to be processed in the neural network apparatus 100. Furthermore, the memory 120 may store applications, drivers, etc. to be driven by the neural network apparatus 100. The memory 120 may be DRAM, but the present disclosure is not limited thereto. The memory 120 may include at least one of volatile memory or nonvolatile memory. The memory 120 may also store trained parameters of the neural network The processor 110 may generate a trained neural network by repeatedly training (learning) a given initial neural network. In this regard, the processor 110 may train the neural network according to a predetermined precision. In other words, the processor 110 may set precision of the parameters processed in the neural network when trained. Precision refers to a degree to which detail the parameters in the neural network may be processed. Precision may be described by a bit width of the parameters in the neural network. In an embodiment, a parameter with high precision such as a parameter of 32 bit floating point precision and a parameter with low precision such as a parameter of 8 bit fixed point precision may be present. In this regard, the parameters may include various types of data input/output to/from the neural network such as input/output activations, as well as weights, biases, etc. of the neural network.

In examples, the processor 110 may process the parameters of the neural network according to a low precision. In other words, the processor 110 may use data having a relatively smaller bit width than typical neural networks as the parameters, thereby reducing the computational amount while reducing the precision. In an embodiment, unlike such typical neural networks that use 32-bit or 64-bit floating-point or fixed-point data, the processor 110 may use 8-bit or 16-bit floating-point or fixed-point data as the parameters according to the low precision. However, when the low precision is commonly set for all layers in the neural network, since a great accuracy loss due to the characteristics of some layers in the neural network may occur, it is found herein, in an example, to lessen or minimize the accuracy loss by setting a high precision for some layers in the neural network.

In examples, the processor 110 may generate a neural network for classification and may train the neural network for classification. The neural network for classification may output an operation result as to which class of input data corresponds to which class. Specifically, the neural network for classification may output an operation result regarding the possibility that the input data corresponds to each of multiple classes as a result value for each of the classes. Also, the neural network for classification may include a softmax layer and a loss layer. The softmax layer may convert the result value for each of classes into a probability value or other probabilistic information. The loss layer may be used to calculate loss as an objective function for learning.

Figure 3:
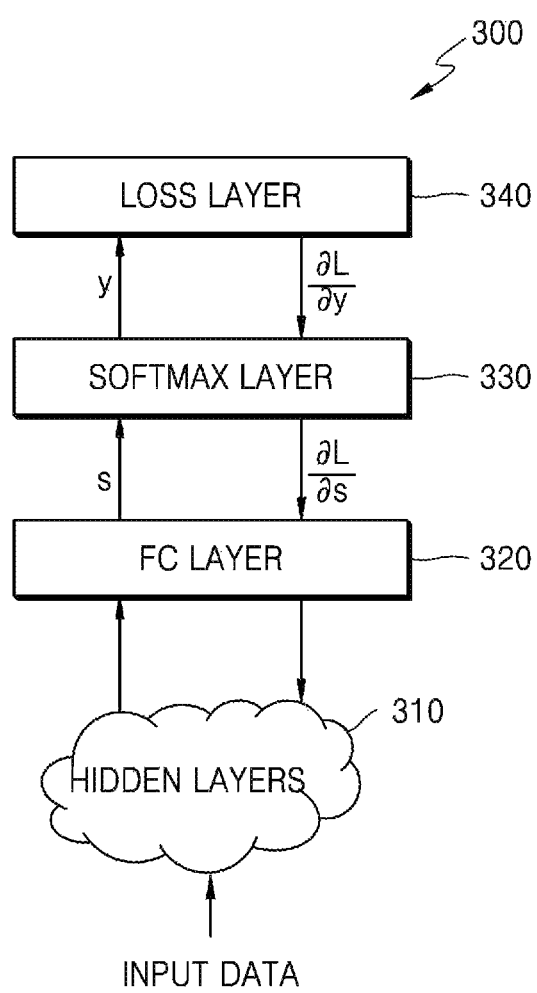
FIG. 3 illustrates a neural network for classification according to one or more embodiments.

FIG. 3 illustrates a neural network 300 for classification according to an embodiment.

The neural network 300 for classification may include hidden layers 310, a fully-connected (FC) layer 320, a softmax layer 330, and a loss layer 340. Some of the hidden layers 310 may be FC layers, and thus the FC layer 320 may be a last FC layer of the neural network 300. In other words, the FC layer 320 may be the FC layer of the last order among FC layers of the neural network 300 as a non-limiting example.

When input data is input to the neural network 300, after the sequential operations of the hidden layers 310 and the FC layer 320, the FC layer 320 may output an operation result(s) regarding the possibility that the input data is classified into each class. In other words, the FC layer 320 may output a result value of the possibility that the input data is classified into each class, as the operation result(s) for each class. Specifically, the FC layer 320 may include nodes corresponding to each class, and each of the nodes of the FC layer 320 may output the result value of the possibility that the input data is classified into each class. In an embodiment, when the neural network 300 is implemented for a classification job targeting five classes, an output value of each of first to fifth nodes of the FC layer 320 may be a result value of the possibility that the input data is classified into each of first to fifth classes.

The FC layer 320 may output the operation result(s) to the softmax layer 330. The softmax layer 330 may convert the operation result(s) into a probability value y. In other words, the softmax layer 330 may generate the probability value y by normalizing the result value of the possibility that the input data is classified into each class. The softmax layer 330 may then output the probability value y to the loss layer 340. The loss layer 340 may calculate a cross-entropy loss L of the operation result(s) based on the probability value y. In other words, the loss layer 340 may calculate the cross-entropy loss L indicating an error of the operation result(s), e.g., based upon a known label for the input training data.

In an embodiment, the softmax layer 330 may convert the computation result(s) into the probability value y by using Equation 2 below, and the loss layer 340 may calculate the cross-entropy loss L of the operation result(s) by using Equation 3 below.

$$y_i = \frac{e^{s_i}}{\sum_{c=1}^{N_c} e^{s_c}} \quad \text{Equation 2}$$

$$L = -\sum_{c=1}^{N_c} t_i \log(y_i) \quad \text{Equation 3}$$

In Equations 2 and 3, $s_i$ denotes an output value of an i-th node of the FC layer 320 (i.e., a result value for an i-th class among the classes), $y_i$ denotes an output value of the i-th node of the softmax layer 330 (i.e. a probability value for the i-th class among the classes), $N_c$ denotes the number of classes, and $t_i$ denotes a ground truth (GT) label for the i-th class.

Then, as a back propagation learning process, the softmax layer 330 may calculate a gradient $$\frac{\partial L}{\partial s_i}$$

or the cross-entropy loss L through the loss layer 340.

In an embodiment, the softmax layer 330 may be considered to calculate rue gradient $$\frac{\partial L}{\partial s_i}$$

of the cross-entropy loss L by using Equation 4.

$$\frac{\partial L}{\partial s_i} = \sum_{k=1}^{N_c} \frac{\partial L}{\partial y_k} \frac{\partial y_k}{\partial s_i} = y_i - t_i \qquad \text{Equation 4}$$

In Equation 4, $s_i$ denotes the output value of the i-th node of the FC layer 320 (i.e., the result value for the i-th class among the classes), $y_i$ denotes the output value of the i-th node of the softmax layer 330 (i.e. the probability value for the i-th class among the classes), $N_c$ denotes the number of classes, and $t_i$ denotes the GT label for the i-th class.

Then, a learning process may be performed for the FC layer 320 may perform a learning process based on the gradient $$\frac{\partial L}{\partial s_i}$$

of the cross-entropy loss L. For example, a weight of the FC layer 320 may be updated in accordance with a gradient decent algorithm. Also, the hidden layers 310 may also have their weights respectively updated in such a back propagation chain learning process.

Figure 4:
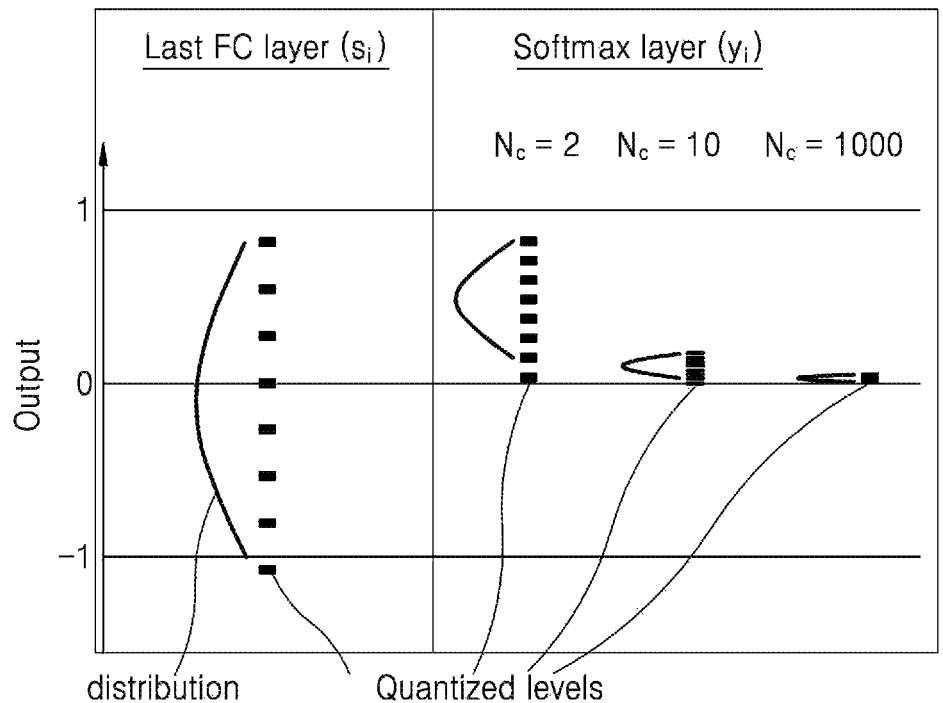
FIG. 4 illustrates output values of each layer in a neural network for classification according to one or more embodiments.
Figure 4:
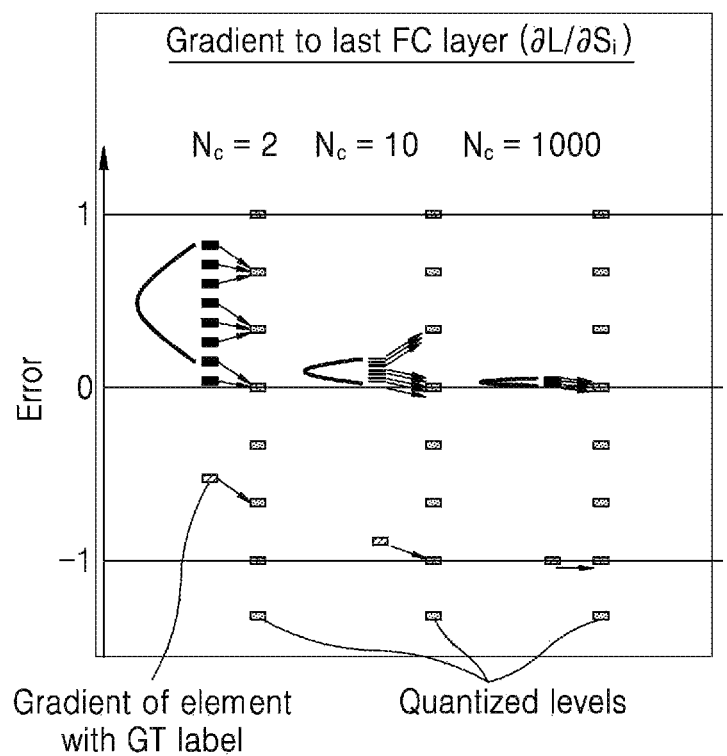

FIG. 4 illustrates output values of each layer in a neural network for classification according to one or more embodiments.

In each layer in the neural network, values according to a predetermined precision may be output. Specifically, referring to FIG. 4, output values of each layer in the neural network may be distributed in quantized levels. For example, when the predetermined precision is a bit width of 3 bits, the output values may be distributed to $2^3$ quantized levels.

Referring to the upper graph of FIG. 4 a training or inference operation, output values $s_i$ of the FC layer 320 which is a last FC layer may be distributed to quantized levels with respect to 0, while output values $y_i$ of the softmax layer 330 may be normalized probability values, and distributed to quantized levels with respect to 1/(number $N_c$ of classes). For example, when the number of classes is 2, the output values $y_i$ of the softmax layer 330 may be distributed to quantized levels with respect to ½, and when the number of classes is 1000, the output values $y_i$ of the softmax layer 330 may be distributed to quantized levels with respect to 1/1000.

The lower graph of FIG. 4 shows, in a back-propagation learning process, the gradient $$\frac{\partial L}{\partial s_i}$$

of the cross-entropy loss L for training the FC layer 320. The gradient for a class corresponding to a GT label may have a value between −1 and 0, but the gradient for other classes may have a value between 0 and 1 due to the characteristics of the gradient according to Equation 4. In particular, the greater the number of classes, the more the gradient for other classes may have a value close to 0.

The gradient for training the FC layer 320 may be processed to have a value according to the predetermined precision. In other words, the gradient used to train the FC layer 320, derived from the softmax layer, may be adjusted to the quantized levels according to a predetermined bit width. However, when the number of classes is large, during a process of adjusting the gradient to the quantized levels, the gradient for the class corresponding to the GT label may be adjusted to −1, but the gradient for the other classes may be adjusted to 0. In an embodiment, referring to the right graph of FIG. 4, when the number of classes is 2, the gradient for classes that do not correspond to the GT label may be adjusted to levels between 0 and 1, whereas when the number of classes is 100, the gradient for the classes that do not correspond to the GT label may all be adjusted to 0. Thus, when the number of classes is large, the sum of the gradients for all the classes may be biased to a negative value, and consequently may have a negative impact on learning or training of the neural network 300.

Therefore, it is required to set precision in consideration of the number of classes with respect to the FC layer 320, rather than setting precision (in particular, low precision) fixed to all the layers in the neural network 300 at one time.

Referring again to FIG. 2, the processor 110 may determine precision for a layer (hereinafter referred to as an output layer) outputting the operation result(s) of the possibility that the input data is classified into each class based on information about the number of classes. For example, referring to FIG. 3, the output layer may be the FC layer 320, which is the last FC layer. The output layer may also be connected to the softmax layer 330 and the loss layer 340.

First, the processor 110 may obtain the information about the number of classes into which the input data may be classified. According to an embodiment, since the number of classes is equal to the number of nodes of the output layer, the processor 110 may determine the number of nodes of the output layer and obtain the information about the number of classes. According to an embodiment, the processor 110 may also obtain the information about the number of classes based on user input or the number of classes may be determined.

The processor 110 may then determine precision for the output layer based on the obtained information about the number of classes.

According to an embodiment, the processor 110 may determine the precision for the output layer in proportion to, or based on, the number of classes. In other words, the processor 110 may determine that the higher the number of classes, the higher the precision for the output layer. For example, when the number of classes is 10, the processor 110 may determine the precision for the output layer as a bit width of 8 bits, and when the number of classes is 100, determine the precision for the output layer as a bit width of 11 bits. Thus, the output layer precision may be variably set based on the number of classes.

According to another embodiment, the processor 110 may determine the precision for the output layer, according to Equation 5 below. That is, the processor 110 may determine the bit width applied to the output layer as the precision for the output layer.

$$\text{bitwidth} > \beta \times \log_2(|\text{class}|) + \alpha \qquad \text{Equation 5:}$$

In Equation 5, |class| denotes the size of classes (that is, the number of classes), $\alpha$ denotes a predetermined bias, and $\beta$ denotes a proportional constant. For example, when $\alpha$ is set to 4, $\beta$ is set to 1, and the number of classes is 10, the processor 110 may determine the precision for the output layer as a bit width of 7.32 bits or more. Further, when $\alpha$ is set to 4 and the number of classes is 100, the processor 110 may determine the precision for the output layer as a bit width of 10.64 bits or more. Further, when $\alpha$ is set to 4 and the number of classes is 1000, the processor 110 may determine the precision for the output layer as a bit width of 14 bits or more.

According to another embodiment, the processor 110 may determine the precision for the output layer to be higher than precision for other layers in the neural network when the number of classes is greater than or equal to a predetermined threshold. In an embodiment, when the number of classes is 10 or more, the processor 110 may determine the precision for the output layer to be higher than a bit width of 8 bits that is the precision for other layers in the neural network.

The processor 110 may process parameters in the output layer according to the predetermined precision. The processor 110 may process the parameters of the output layer to have the predetermined precision and perform a training/learning process of the neural network through the parameters having the predetermined precision. The parameters of the output layer may be trained using a gradient of the cross-entropy loss derived with respect to a subsequent softmax layer. Accordingly, the processor 110 may adjust the gradient of the cross-entropy loss input to the output layer to a quantized level according to a predetermined bit width and perform the training/learning process of the neural network through the adjusted gradient. Further, the parameters of the output layer may further include weight and activation of the output layer.

Accordingly, the neural network apparatus 100 may set the precision for the output layer such as the last FC layer in consideration of the number of classes, e.g., rather than setting a fixed precision for all the layers in the neural network, thereby lessening or minimizing the accuracy loss in the training/learning process. In particular, the neural network apparatus 100 may process the parameters of the neural network with a low precision with respect to other layers of the neural network while processing the parameters of the output layer of the neural network with a high precision in consideration of the number of classes, thereby lessening or minimizing the accuracy loss that may occur due to the collective low precision setting.

Figure 5:
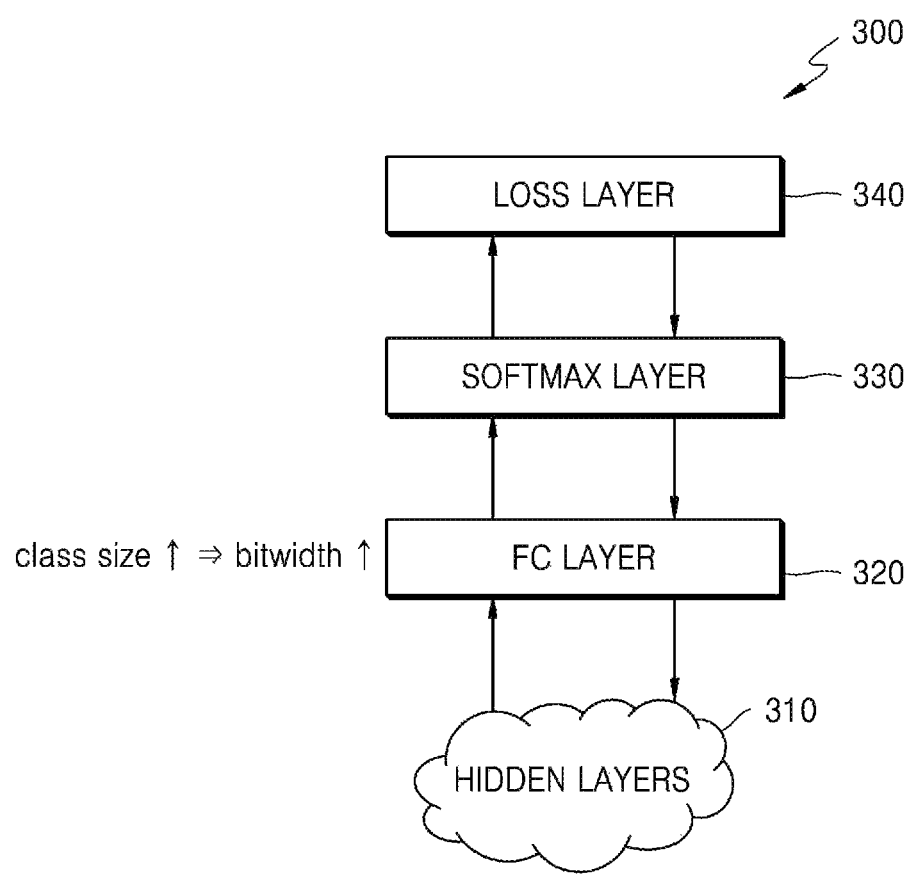
FIG. 5 illustrates a method of determining precision in a neural network for classification according to one or more embodiments.

FIG. 5 illustrates an example of determining a precision in the neural network 300 for classification according to an embodiment.

The neural network apparatus 100 may obtain information on the class size of the neural network 300 for classification. That is, the neural network apparatus 100 may obtain information about the number of classes into which input data may be classified in the neural network 300 for classification. The neural network apparatus 100 may obtain the information about the number of classes by determining the number of nodes of the FC layer 320 which is a last FC layer.

The neural network apparatus 100 may determine precision for the FC layer 320, which is an output layer, based on the obtained information about the number of classes. The neural network apparatus 100 may determine the precision for the FC layer 320 to be proportional to the number of classes. For example, when the number of classes is 10, the neural network apparatus 100 may determine the precision for the FC layer 320 as a bit width of 10 bits, and when the number of classes is 1000, the neural network apparatus 100 may determine the precision for the FC layer 320 as a bit width of 16 bits.

The neural network apparatus 100 may process parameters in the FC layer 320 according to a predetermined precision. According to an embodiment, the neural network apparatus 100 may process a gradient of a cross-entropy loss output from the softmax layer 330 and used to train the FC layer 320, to have a predetermined precision, and thus proceed with the learning/training of the neural network 300 through the gradient having the predetermined precision. Training of the neural network 300 may be continued with adjustments of the parameters of the neural network until the neural network is trained to a predetermined accuracy and/or predetermined inaccuracy.

Figure 6:
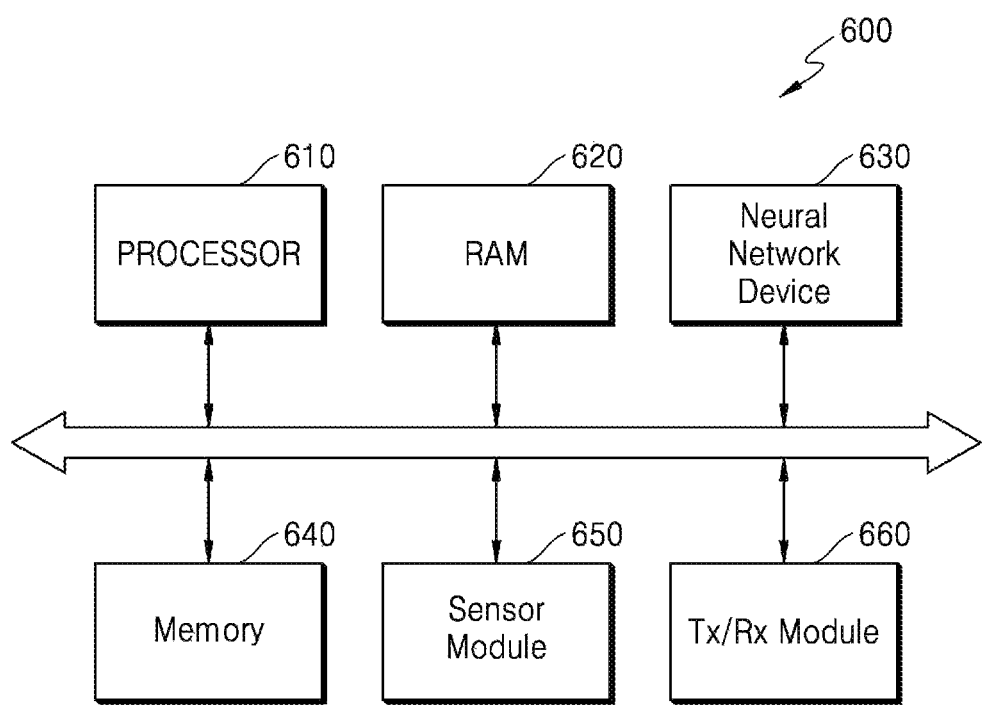
FIG. 6 is a block diagram of an electronic system according to one or more embodiments.

FIG. 6 is a block diagram of an electronic system 600 according to an embodiment.

Referring to FIG. 6, the electronic system 600 may extract effective information by analyzing input data in real time based on a neural network, determine a situation based on the extracted information, or control elements of the electronic device represented by or on which the electronic system 600 is mounted. For example, the electronic system 600 may be any one of, or applied to, or mounted in, robot devices such as drones, advanced drivers assistance system (ADAS), etc., smart TVs, smart phones, medical devices, mobile devices, image display devices, measuring devices, IoT devices, etc., as non-limiting electronic device examples.

The electronic system 600 may include a processor 610, RAM 620, a neural network apparatus 630, a memory 640, a sensor module 650, and a communication (TX/RX) module 660. The electronic system 600 may further include an input/output module, a security module, a power control device, etc. Some hardware components of the electronic system 600 may be mounted on at least one semiconductor chip, for example. In examples, the neural network apparatus 630 may include the above-described neural network apparatus 1000 or neural network dedicated hardware accelerator or an apparatus including the same.

The processor 610 may control some or all operations of the electronic system 600. The processor 610 may include one processor core (Single Core), or a plurality of processor cores (Multi-Core). The processor 610 may process or execute instructions and programs and/or data stored in the memory 640. In an embodiment, the processor 610 may control implementations of the neural network apparatus 630 by executing the instructions stored in the memory 640. The processor 610 may also be implemented by a CPU, a GPU, an AP, etc.

The RAM 620 may temporarily store programs, data, or instructions. For example, the programs and/or data stored in the memory 640 may be temporarily stored in the RAM 620 according to a booting code or the control of the processor 610. The RAM 620 may be implemented by memory such as dynamic RAM (DRAM) or static RAM (SRAM), etc. The ram may also temporarily store initial or interim parameters as during any of the training operations described herein and performed by the system 600.

The neural network apparatus 630 may perform an operation of a neural network based on the received input data, and generate an information signal based on a result of the operation, e.g. using the neural network described herein. The neural network may include CNNs, RNNs, deep belief networks, restricted Boltzman machines, etc., but the present disclosure is not limited thereto. The neural network apparatus 630 is hardware that drives the above-described neural network for classification and may correspond to the neural network dedicated hardware accelerator.

The information signal may include one of various types of recognition signals such as voice recognition signal, object recognition signal, image recognition signal, biometric information recognition signal, etc. For example, the neural network apparatus 630 may receive frame data included in a video stream as input data, and generate from frame data a recognition signal for an object included in an image indicated by the frame data and operate or not operate based on the recognition, or lock or unlock access to the corresponding device. However, the present disclosure is not limited thereto, and the neural network apparatus 630 may receive various types of input data and generate a recognition or classification signal according to the input data, according to the type of an electronic device on which the electronic system 600 is represented by or mounted in.

The memory 640 is a storage for storing data, such as, an operating system (OS), various programs, and various pieces of data. In an embodiment, the memory 640 may store intermediate results generated in an operation performing process of the neural network apparatus 630, such as, an output feature map, as an output feature list or an outer feature matrix. In an embodiment, the memory 640 may store a compressed output feature map. Furthermore, the memory 640 may store quantized neural network data, such as, parameters, weight maps, or a weight list, which are used by the neural network apparatus 630.

The memory 640 may be DRAM, but the present disclosure is not limited thereto. The memory 640 may include at least one of a volatile memory and a nonvolatile memory. The nonvolatile memory may include ROM, PROM, EPROM, EEPROM, flash memory, PRAM, MRAM, RRAM, FRAM, etc. The volatile memory may include DRAM, SRAM, SDRAM, PRAM, MRAM, RRAM, FeRAM, etc. In an embodiment, the memory 640 may include at least one of HDD, SSD, CF, SD, Micro-SD, Mini-SD, xD, and Memory Stick.

The sensor module 650 may collect information about the periphery of the electronic device represented by, or on which the electronic system 600 is mounted. The sensor module 650 may sense or receive a signal, such as, an image signal, a voice signal, a magnetic signal, a biometric signal, a touch signal, etc., from the outside of the electronic device, and convert a sensed or received signal to data. To this end, the sensor module 650 may include at least one of various types of sensing devices, such as microphones, imaging devices, image sensors, light detection and ranging (LIDAR) sensors, ultrasonic sensors, infrared sensors, biosensors, touch sensors, etc.

The sensor module 650 may provide the neural network apparatus 630 with the converted data as input data. For example, the sensor module 650 may include an image sensor, and may generate a video stream by photographing the external environment of the electronic device, and provide the neural network apparatus 630 with consecutive data frames of the video stream in order as input data. However, the present disclosure is not limited thereto, and the sensor module 650 may provide various types of data to the neural network apparatus 630.

The communication module 660 may include various wired or wireless interfaces capable of communicating with external devices. For example the communication module 660 may include a local area network (LAN), wireless local area network (WLAN) such as wireless fidelity (Wi-Fi), wireless personal area network (WPAN) such as Bluetooth, wireless universal serial bus (USB), ZigBee, near field communication (NFC), radio-frequency identification (RFID), power line communication (PLC), or a communication interface capable of connecting to a mobile cellular network such as 3rd generation (3G), 4th generation (4G), long-term evolution (LTE), etc.

Figure 7:
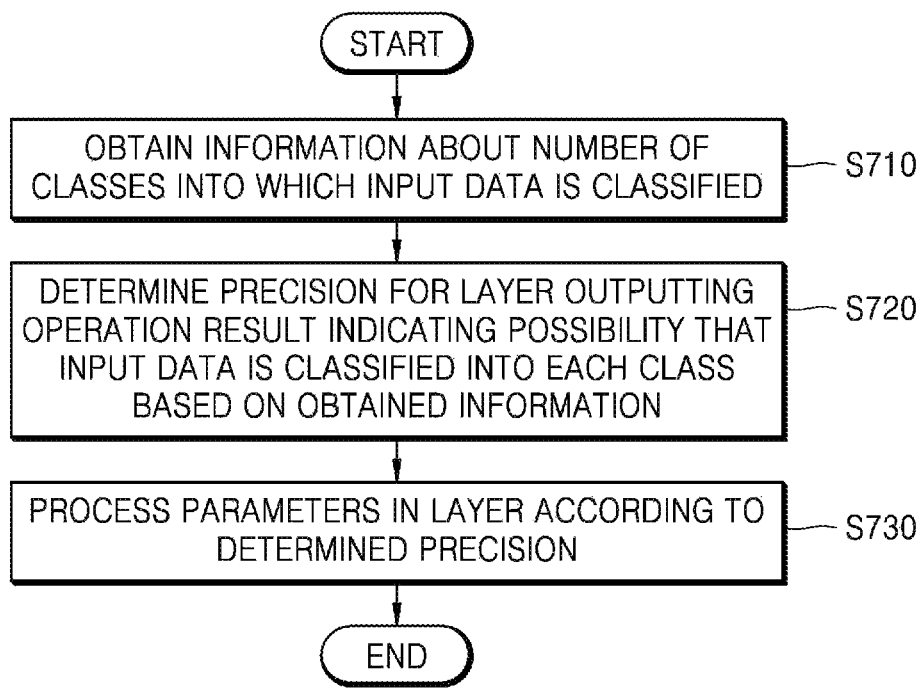
FIG. 7 is a diagram for explaining a method of operating a neural network apparatus according to one or more embodiments.

FIG. 7 is a diagram for explaining a method of operating the neural network apparatus 100 according to an embodiment.

The method shown in FIG. 7 may be performed by the neural network apparatus 100 of FIG. 2 or each component of the electronic system of FIG. 6, as non-limiting examples. Accordingly, redundant explanations are omitted below.

In operation S710, the neural network apparatus 100 may obtain information about a number of classes into which input data may be classified. According to an embodiment, the neural network apparatus 100 may determine a number of nodes of a layer outputting an operation result indicating a possibility that the input data is classified into each class and obtain the information about the number of classes. According to an embodiment, the neural network apparatus 100 may obtain the information about the number of classes based on a user input.

In operation S720, the neural network apparatus 100 may determine precision for that layer (hereinafter referred to as an output layer) for outputting the operation result indicating the possibility that the input data is classified into each class, based on the information obtained in operation S710. According to an embodiment, the neural network apparatus 100 may determine the precision for the output layer to be in proportion to the number of classes. According to another embodiment, the neural network apparatus 100 may determine the precision for the output layer according to Equation 4. According to another embodiment, the neural network apparatus 100 may determine the precision for the output layer to be higher than precision for other layers of the neural network when the number of classes is greater than or equal to a predetermined threshold.

In operation S730, the neural network apparatus 100 may process parameters in the layer according to the precision determined in operation S720. The neural network apparatus 100 may process the parameters of the output layer to have a predetermined accuracy and perform a training/learning process of the neural network through the parameters having the predetermined precision. The learned parameters may then be stored in memory.

According to embodiments, a neural network apparatus may selectively not set a fixed precision for all layers in a neural network and may set precision in consideration of the number of classes for an output layer such as a last FC layer, thereby lessening or minimizing the precision loss in a training/learning process of the neural network.

The neural network apparatus 100, processor 110, memory 120, RAM 620, Neural Network Device 630, sensor module 650, Tx/Rx module 660, in FIGS. 1-7 that perform the operations described in this application are implemented by hardware components configured to perform the operations described in this application that are performed by the hardware components. One or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods that perform the operations described in FIGS. 1-7 this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

The use of the terms "a" and "an" and "the" and similar referents in the context of describing the disclosure (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the operations of all methods described herein may be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. Numerous modifications and adaptations will be readily apparent to those of ordinary skill in this art without departing from the spirit and scope of the disclosure.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented neural network method of an apparatus that includes a processor and a memory storing information, including stored predetermined precision parameters of a layer of an in-training neural network, about the layer, the method comprising:

generating new parameters, with a set precision, for the layer based on the stored parameters, where the precision is set based on a result of a determination of a number of output classes of the layer based on information about the layer in the memory indicative of the number of output classes;
generating a trained neural network configured to generate an inference result based on an input provided to the trained neural network by training the layer of the in-training neural network using the new parameters such that a layer of the trained neural network has the set precision, the layer of the trained neural network is corresponding to the layer of the in-training neural network,
wherein a set precision of the layer with a first number of output classes is greater than another set precision of the layer with a second number of output classes that are less than the first number of output classes, and
wherein the set precision of the parameters is a bit width of the new parameters.

2. The method of claim 1, further comprising:
generating loss information of the layer; and
performing the training of the layer dependent on the generated loss.

3. The method of claim 1, wherein the set precision is proportionally set with respect to the determined number of output classes.

4. The method of claim 1, further comprising:
determining whether the determined number of output classes meets a predetermined threshold,
wherein when the determined number of output classes is determined to meet the predetermined threshold, the set precision for the layer is set to be higher than a precision of other layers of the neural network.

5. The method of claim 1, wherein the layer is a last fully-connected layer of the neural network.

6. The method of claim 1,
wherein the neural network further comprises a softmax layer configured to receive results of a forward implementation of the layer, and
wherein the training of the neural network is based on gradients of a cross-entropy loss derived from a loss generated by a loss layer connected to the softmax layer during the training.

7. The method of claim 1, wherein the training of the layer includes training the layer by selectively adjusting the new parameters according to respective gradients of a cross-entropy loss derived from a loss, of the neural network, dependent on results of a forward implementation of the layer with the new parameters.

8. A non-transitory computer-readable recording medium storing instructions which when executed by one or more processors causes the one or more processors to perform the method of claim 1.

9. A neural network apparatus, the apparatus comprising:
a memory storing information, including stored pre-determined precision parameters of a layer of an in-training neural network, about the layer; and
a processor configured to:
generate new parameter, with a set precision, for the layer based on the stored parameters, where the precision is set based on a result of a determination of a number of output classes of the layer based on information about the layer in the memory indicative of the number of output classes; and
generate a trained neural network configured to generate an inference result based on an input provided to the trained neural network by training the layer of the in-training neural network using the new parameters such that a layer of the trained neural network has the set precision, the layer of the trained neural network is corresponding to the layer of the in-training neural network,
wherein a set precision of the layer with a first number of output classes is greater than another set precision of the layer with a second number of output classes that are less than the first number of output classes, and
wherein the set precision is a bit width of the new parameters.

10. The apparatus of claim 9, further comprising:
generating loss information of the layer; and
performing the training of the layer dependent on the generated loss.

11. The apparatus of claim 9, wherein, for the setting of the precision, the processor is configured to set the precision proportionally to the determined number of output classes.

12. The apparatus of claim 9, wherein, for the setting of the precision, the processor is configured to set, when the result of the determination is that the number of output classes meets a predetermined threshold, the precision for the layer to be higher than that for other layers of the neural network.

13. The apparatus of claim 9, wherein the layer is a last fully-connected layer in the neural network.

14. The apparatus of claim 9,
wherein the neural network further comprises a softmax layer configured to receive results of a forward implementation of the layer,
wherein, for the training, the processor is configured to train the neural network based on gradients of a cross-entropy loss derived from a loss generated by a loss layer connected to the softmax layer for the training.

15. The apparatus of claim 9, wherein the processor is further configured to perform the training of the layer through selective adjustment of the new parameters according to respective gradients of a cross-entropy loss derived from a loss, of the neural network, dependent on results of a forward implementation of the layer with the new parameters.

16. The apparatus of claim 9, wherein the memory, or another memory of the apparatus, stores instructions, which when executed by the processor configure the processor to perform the generation of the new parameters, and the training of the layer.

17. The method of claim 1, wherein the number of output classes of the layer is equal to a total number of activation nodes of the layer.

18. The method of claim 1, wherein a precision of respective gradients used in the training equals the generated precision.

19. The method of claim 1, further comprising performing the determination of the number of output classes of the layer.

* * * * *